(12) United States Patent
Tsuji et al.

(10) Patent No.: US 7,291,214 B2
(45) Date of Patent: Nov. 6, 2007

(54) INK, INK SET, INK JET RECORDING METHOD, INK CARTRIDGE AND INK JET RECORDING APPARATUS

(75) Inventors: Itaru Tsuji, Kawasaki (JP); Yoshio Nakajima, Yokohama (JP); Shinichi Hakamada, Kawasaki (JP); Yoichi Takada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/415,174

(22) Filed: May 2, 2006

(65) Prior Publication Data

US 2006/0196389 A1 Sep. 7, 2006

Related U.S. Application Data

(63) Continuation of application No. PCT/JP2006/300920, filed on Jan. 17, 2006.

(30) Foreign Application Priority Data

Jan. 18, 2005 (JP) ............................ 2005-010305

(51) Int. Cl.
C09D 11/00 (2006.01)
C09D 11/02 (2006.01)
B41J 2/01 (2006.01)

(52) U.S. Cl. ..................... 106/31.8; 347/100
(58) Field of Classification Search ............... 106/31.8; 347/100

See application file for complete search history.

(56) References Cited

U.S. PATENT DOCUMENTS 3,520,869 A * 7/1970 Stocker ...................... 534/739

(Continued)

FOREIGN PATENT DOCUMENTS

JP 60-36224 B2 8/1985

(Continued)

*Primary Examiner*—Helene Klemanski
(74) *Attorney, Agent, or Firm*—Fitzpatrick, Cella, Harper & Scinto

(57) ABSTRACT

An ink to be used in an ink jet recording method of ejecting an ink from a recording head through action of thermal energy can improve the ink ejection stability. An ink to be used in an ink jet recording method of ejecting an ink from a recording head through action of thermal energy is characterized in that the ink comprises a pigment represented by the general formula (1), a dispersant and a water-soluble organic compound, and the pigment substantially shows neither an exothermic peak nor an endothermic peak in the range 25° C. or more to 200° C. or less of a DSC curve obtained by means of a differential scanning calorimeter (DSC)

General formula (1)

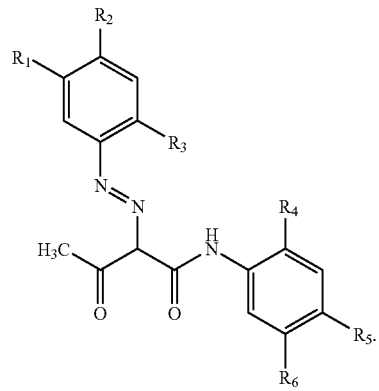

11 Claims, 4 Drawing Sheets

U.S. PATENT DOCUMENTS

| | | | |
|---|---|---|---|
| 5,620,793 A | 4/1997 | Suzuki et al. | 428/342 |
| 5,738,716 A * | 4/1998 | Santilli et al. | 106/31.77 |
| 5,782,967 A | 7/1998 | Shirota et al. | 106/31.58 |
| 6,036,307 A | 3/2000 | Hakamada et al. | 347/106 |
| 6,074,052 A | 6/2000 | Inui et al. | 347/101 |
| 6,132,501 A * | 10/2000 | Scaringe et al. | 106/31.75 |
| 6,136,081 A * | 10/2000 | Scaringe et al. | 106/31.75 |
| 6,188,850 B1 | 2/2001 | Sakaki et al. | 428/342 |
| 6,214,963 B1 | 4/2001 | Noguchi et al. | 528/71 |
| 6,221,141 B1 | 4/2001 | Takada et al. | 106/31.6 |
| 6,342,095 B1 | 1/2002 | Takizawa et al. | 106/31.27 |
| 6,398,355 B1 | 6/2002 | Shirota et al. | 347/105 |
| 6,435,658 B1 | 8/2002 | Kato et al. | 347/43 |
| 6,474,803 B1 | 11/2002 | Shirota et al. | 347/100 |
| 6,488,759 B1 * | 12/2002 | Hays | 106/496 |
| 6,530,656 B1 | 3/2003 | Teraoka et al. | 347/100 |
| 6,540,329 B1 | 4/2003 | Kaneko et al. | 347/43 |
| 6,552,156 B2 | 4/2003 | Noguchi et al. | 528/71 |
| 6,582,070 B2 | 6/2003 | Takada et al. | 347/100 |
| 6,646,024 B2 * | 11/2003 | Beach et al. | 523/160 |
| 6,676,254 B2 | 1/2004 | Nagashima et al. | 347/100 |
| 6,692,559 B2 * | 2/2004 | Ishigami et al. | 106/31.8 |
| 6,698,876 B2 | 3/2004 | Sato et al. | 347/100 |
| 6,706,104 B2 | 3/2004 | Takuhara et al. | 106/31.6 |
| 6,706,105 B2 | 3/2004 | Takada et al. | 106/31.6 |
| 6,723,137 B1 | 4/2004 | Hakamada et al. | 8/549 |
| 6,848,781 B2 | 2/2005 | Ogino et al. | 347/105 |
| 6,918,955 B2 * | 7/2005 | Yokoyama et al. | 106/31.28 |
| 6,929,362 B2 | 8/2005 | Takada et al. | 347/100 |
| 6,932,465 B2 | 8/2005 | Nito et al. | 347/96 |
| 6,935,732 B2 | 8/2005 | Takada et al. | 347/96 |
| 6,976,755 B2 | 12/2005 | Sato et al. | 347/100 |
| 7,005,461 B2 | 2/2006 | Sanada et al. | 523/160 |
| 2002/0096085 A1 * | 7/2002 | Gotoh et al. | 106/31.86 |
| 2004/0016367 A1 * | 1/2004 | Koike et al. | 106/31.86 |
| 2004/0027404 A1 | 2/2004 | Nagashima et al. | 347/8 |
| 2004/0059020 A1 | 3/2004 | Kamoto et al. | 523/160 |
| 2004/0069183 A1 | 4/2004 | Kamoto et al. | 106/31.27 |
| 2004/0094065 A1 * | 5/2004 | Reem et al. | 106/31.14 |
| 2004/0099182 A1 | 5/2004 | Kamoto et al. | 106/31.59 |
| 2004/0138337 A1 * | 7/2004 | Hasegawa et al. | 523/160 |
| 2004/0231554 A1 | 11/2004 | Udagawa et al. | 106/31.15 |
| 2004/0244622 A1 | 12/2004 | Ichinose et al. | 101/491 |
| 2005/0007436 A1 | 1/2005 | Ogino et al. | 347/105 |
| 2005/0109952 A1 | 5/2005 | Udagawa et al. | 250/461.1 |
| 2005/0124728 A1 * | 6/2005 | Komatsu et al. | 523/160 |
| 2005/0195243 A1 | 9/2005 | Nagashima et al. | 347/54 |
| 2005/0204955 A1 | 9/2005 | Nagashima et al. | 106/31.59 |
| 2005/0219341 A1 | 10/2005 | Nito et al. | 347/100 |
| 2006/0000386 A1 | 1/2006 | Hakamada et al. | 106/31.13 |
| 2006/0007288 A1 | 1/2006 | Takada et al. | 347/100 |
| 2006/0007289 A1 | 1/2006 | Nito et al. | 347/100 |
| 2006/0011097 A1 | 1/2006 | Tsuji et al. | 106/31.48 |
| 2006/0014855 A1 * | 1/2006 | House et al. | 523/160 |
| 2006/0065157 A1 | 3/2006 | Kawabe et al. | 106/31.48 |
| 2006/0089424 A1 | 4/2006 | Sanada et al. | 523/160 |
| 2006/0098067 A1 | 5/2006 | Imai et al. | 347/100 |
| 2006/0098068 A1 | 5/2006 | Hakamada et al. | 347/100 |
| 2006/0100311 A1 | 5/2006 | Tokuda et al. | 523/160 |
| 2006/0103704 A1 | 5/2006 | Hakamada et al. | 347/100 |
| 2006/0124032 A1 | 6/2006 | Ichinose et al. | 106/400 |
| 2006/0125895 A1 | 6/2006 | Nito et al. | 347/100 |
| 2006/0130706 A1 | 6/2006 | Nakajima et al. | 106/499 |
| 2006/0135647 A1 | 6/2006 | Ichinose et al. | 523/160 |
| 2006/0142416 A1 | 6/2006 | Sakai et al. | 523/160 |
| 2006/0142417 A1 | 6/2006 | Kaneko et al. | 523/160 |
| 2006/0192827 A1 * | 8/2006 | Takada et al. | 347/100 |
| 2006/0196389 A1 | 9/2006 | Tsuji et al. | 106/31.43 |

FOREIGN PATENT DOCUMENTS

| | | |
|---|---|---|
| JP | 9-165538 | 6/1997 |
| JP | 2000-63694 | 2/2000 |
| JP | 3055673 B2 | 4/2000 |
| JP | 2001-324837 | 11/2001 |
| JP | 2001-354888 | 12/2001 |
| JP | 2004-107481 | 4/2004 |
| JP | 2004-168793 | 6/2004 |
| JP | 2004-168794 | 6/2004 |
| JP | 2004-182952 | 7/2004 |
| JP | 2004-210914 | 7/2004 |

* cited by examiner

INK, INK SET, INK JET RECORDING METHOD, INK CARTRIDGE AND INK JET RECORDING APPARATUS

This application is a continuation of International Application No. PCT/JP2006/300920, filed on Jan. 17, 2006, which claims the benefit of Japanese Patent Application No. 2005-010305 filed on Jan. 18, 2005.

BACKGROUND OF THE INVENTION

1. Field of the Invention

This invention relates to an ink to be used in an ink jet recording method in which ink is ejected from a recording head through action of thermal energy, an ink cartridge, an ink jet recording method and an ink jet recording apparatus using such an ink. More particularly, the present invention relates to an ink containing a coloring material having a specific structure that can improve the ink ejection stability and shows a high storage stability as well as an ink cartridge, an ink jet recording method and an ink jet recording apparatus for using such an ink.

2. Related Background Art

Ink jet recording is a recording method in which ink is applied to a recording medium such as a sheet of paper to form an image thereon. It enables printing with a less expensive apparatus, a high resolution and a high speed. Ink jet recording has become very popular in recent years as means for forming color images with ease and there is an increasing demand for higher quality color images.

Currently, various pigments are being used as coloring materials to be used for ink jet recording. Since azo pigments particularly show an excellent coloring ability and are advantageous in terms of cost, various developments are under way.

For example, C. I. Pigment Yellow 74, which is a monoazo pigment, shows a high coloring ability and can produce sharp and well-developed color images so that it is being popularly used as coloring material for yellow ink used in an ink jet recording method.

However, C. I. Pigment Yellow 74 is particularly thermally unstable among numerous pigments. For this reason, pigment particles of C. I. Pigment Yellow 74 are grown or crystals thereof are transformed to change the color tone, lowers color density and/or produce dull colors or opaque colors depending on heat conditions in heating and kneading in a kneading step of resin and pigment. Techniques for improving the thermal stability of pigments include, for example, mixing an azo pigment that is poorly thermally stable with a thermally stable insoluble monoazo pigment, an insoluble disazo pigment or a condensed (poly-) azo pigment with a specific ratio.

It is also known that a popular method called co-coupling is effective for manufacturing fine pigments (see, e.g., Japanese Patent Publication No. 60-36224 and Japanese Patent No. 3055673). There have been made proposals relating to monoazo pigment compositions containing two or more monoazo pigments of different types that are obtained by subjecting bases and couplers of different types to a coupling reaction when synthesizing a yellow monoazo pigment (see, e.g., Japanese Patent Application Laid-Open No. 2000-63694 and Japanese Patent Application Laid-Open No. 2001-324837).

Proposals for manufacturing C. I. Pigment Yellow 74 with an improved thermal stability by dispersing a thermally stable pigment in a reaction vessel, synthesizing C. I. Pigment Yellow 74 by means of a diazotizing/coupling reaction and subsequently maturing the reaction mixture (pigment formation) are also known (see, e.g., Japanese Patent Application Laid-Open No. 2004-182952).

Various other proposals have also been made for the purpose of improving the reliability (storage stability, ejection stability and so on) and the high image quality (fixing ability, marker resistance and so on) of an ink jet recording ink prepared by using pigments as coloring materials. For example, techniques of using an ink containing a compound having an alkylene oxide chain to improve the ejection performance and prevent the ink ejection micro-orifices arranged at the recording head from clogging have been proposed (see, e.g., Japanese Patent Application Laid-Open No. H9-165538). Inks prepared so as to contain a 1,2-alkanediol or a glycol monoether for the purpose of improving the permeability of ink have also been proposed (see, e.g., Japanese Patent Application Laid-Open No. 2001-354888).

In particular, there are recently made proposals for solving the above identified problems by designing properties and contents of water-soluble organic solvents and the additives contained in ink along with coloring materials.

The inventors of the present invention conducted evaluation of ejection stability of ink by loading an ink jet recording apparatus adapted to eject ink from the recording head thereof through action of thermal energy (to be also referred to as thermal type ink jet recording apparatus hereinafter) with an ink containing a monoazo pigment as coloring material. As a result, it was found that various phenomena occur as ink is ejected continuously, which phenomena include that the volume of the ejected ink gradually decreases and that impact position of ink on the recording medium becomes shifted. In short, the ejection stability is gradually degraded.

In view of the findings, the inventors of the present invention looked into the causes of degradation of the ejection stability and observed how the pigment dispersion that is contained in an ink changes as the ink passes through an ink flow path of the recording head and is ejected from the ejection orifices.

As a result, it was found that the dispersion breakdown of the pigment dispersion that is caused by the heat applied to it when ink droplets are ejected occurs rapidly and excessively particularly in the case of monoazo pigment dispersions that show a low thermal stability among numerous pigment dispersions.

In other words, the ejection stability is degraded not because of the clogged ink ejection orifices, which have hitherto been known. When heat is applied to an ink containing thermally unstable monoazo pigments as coloring material to raise the ink temperature, dispersion breakdown of the pigment dispersion takes place rapidly and excessively. Then, as a result, deposits adhere to the inside of the ink flow path and vicinity of the ejection orifices to consequently block the ink flow path of the recording head and degrade the ejection stability.

The above-described phenomenon has not been known so far and the present invention is based on this finding.

Thus, it is an object of the present invention to provide an ink to be used in an ink jet recording method in which ink is ejected from a recording head through action of thermal energy that can improve the ink ejection stability.

Another object of the present invention is to provide an ink set, an ink cartridge, an ink jet recording method and an ink jet recording apparatus using such an ink.

SUMMARY OF THE INVENTION

In an aspect of the present invention, the above objects are achieved by providing an ink for use in an ink jet recording method in which an ink is ejected from a recording head through action of thermal energy, characterized in that the ink comprises a pigment represented by the general formula (1), a dispersant and a water-soluble organic compound, and the pigment substantially shows neither an exothermic peak nor an endothermic peak in the range 25° C. or more to 200° C. or less of a DSC curve obtained by means of a differential scanning calorimeter (DSC).

General formula (1)

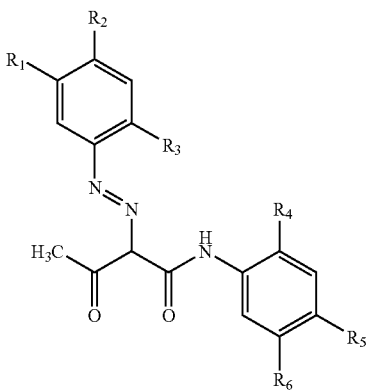

(In the general formula (1), $R_1$, $R_2$, $R_3$, $R_4$, $R_5$ and $R_6$ each independently represent a hydrogen atom, an alkyl group having 1 to 3 carbon atoms, a fluoroalkyl group having 1 to 3 carbon atoms, an alkoxyl group having 1 to 3 carbon atoms, a halogen atom, a nitro group, a sulfonic acid group or an alkaline earth metal salt thereof, an N-phenylaminosulfonyl group, a carboxyl group or an alkaline earth metal salt thereof, a carboamide group, an N-phenylcarbamoyl group, an ureylene group, an iminodicarbonyl group or a carboxylate group.)

In still another aspect of the present invention, there is provided an ink set comprising a plurality of inks, characterized in that the ink set comprises an ink as defined above and at least one ink having a hue different from that of the ink.

In still another aspect of the present invention, there is provided an ink jet recording method, comprising a step of ejecting an ink by ink jet recording method, characterized in that the ink is an ink as described above.

In still another aspect of the present invention, there is provided an ink cartridge, comprising an ink storage portion for storing ink, characterized in that the ink is an ink as described above.

In a further aspect of the present invention, there is provided an ink jet recording apparatus, comprising an ink storage portion for storing ink and a recording head for ejecting an ink, characterized in that the ink is an ink as described above.

Thus, the present invention solves the particular problem of degradation of the ejection stability caused by the adhesion of deposits generated when an ink containing a poorly thermally stable monoazo pigment is ejected continuously from a recording head through action of thermal energy.

Thus, according to the present invention, there is provided an ink to be used in an ink jet recording method in which ink is ejected from a recording head through action of thermal energy that can improve the ink ejection stability.

According to the present invention, there are provided an ink set, an ink cartridge, an ink jet recording method and an ink jet recording apparatus using such an ink.

DETAILED DESCRIPTION OF THE PREFERRED EMBODIMENTS

Now, the present invention will be described below in greater detail by way of preferred embodiments of the invention.

In the course of looking for the causes of the adhesion of deposits to the inside of the ink flow path and vicinity of the ejection orifices, the inventors of the present invention assumed that one of the causes of the above described phenomenon is the influence of the heat applied to the ink that is ejected. Thus, the inventors conducted the following experiment by using an ink with which deposits adhere to the inside of the ink flow path and vicinity of the ejection orifices when a thermal type ink jet recording apparatus is used. The ink is loaded in an ink jet recording apparatus adapted to convert an electric signal into a mechanical signal by means of an electrostriction element to eject an ink from a recording head through action of mechanical energy (to be referred to as a piezo type ink jet recording apparatus hereinafter) and the ejection stability of the ink was evaluated. As a result, the volume of the ejected ink did not change and the ejection was held in a stable state, when the ink ejection was made to continue for a long time.

Thus, the inventors of the present invention came to firmly believe that the phenomenon that deposits adhere to the inside of the ink flow path and vicinity of the ejection orifices arises specifically when an ink containing a monoazo pigment that is thermally poorly stable is ejected by means of a thermal type ink jet recording apparatus.

On the basis of the obtained finding, the inventors of the present invention conducted a simulation to confirm the phenomenon that occurs in the course of ejecting an ink, using a thermal type ink jet recording apparatus. As a result, the inventors reached to the conclusion that the largest cause that generates deposits is the phenomenon as described below that takes place in the ink flow path.

(Mechanism of Generating Deposits)

FIGS. 1A, 1B, 1C, 1D, 1E, 1F, 1G and 1H are schematic illustration of the mechanism of generation of deposits vicinity of an ejection orifice when a thermal type ink jet recording apparatus is used. Referring to FIGS. 1A to 1H, FIG. 1A illustrates an filmy air bubble 6 just generated on a heater 1 and FIGS. 1B, 1C, 1D, 1E, 1F, 1G and 1H illustrate the conditions after about 1 μsec, about 2.5 μsec, about 3 μsec, about 4 μsec, about 4.5 μsec, about 6 μsec, and about 9 μsec respectively. Note that the horizontally hatched parts in FIGS. 1A to 1H are parts of an orifice plate or a flow path wall.

Figure 1A:
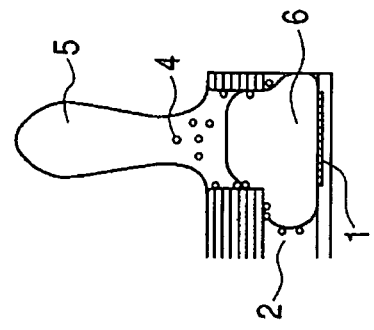
FIGS. 1A, 1B, 1C, 1D, 1E, 1F, 1G and 1H are schematic illustration of the mechanism of generation of deposits.

Firstly, as shown in FIG. 1A, as the heater 1 is electrically energized according to a recording signal, an air bubble 6 is generated on the heater 1 in the inside of an ink flow path 2. The ink temperature is raised to about 200° C. in the vicinity of the heater 1. Then, dispersion breakdown of the pigment dispersion takes place to give rise to phenomena such as detachment of a dispersant from the pigment and fragmentation of the pigment. As a result, some particles of the pigment become to be unstably dispersed in the ink. Since dispersion breakdown takes place rapidly and excessively in the ink that contains the thermally poorly stable monoazo pigment, many particles of the pigment become to be unstably dispersed in the ink.

Figure 1B:
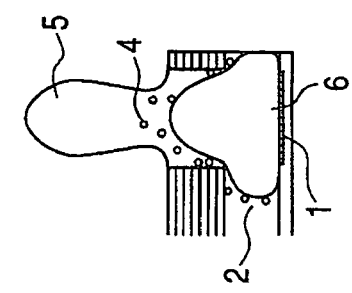
Figure 1C:
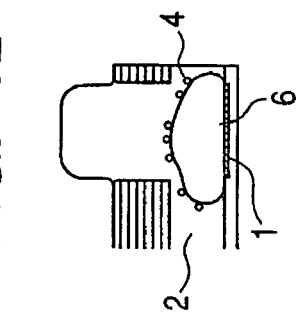
Figure 1D:
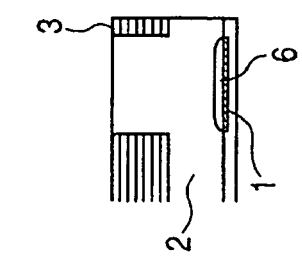
Figure 1E:
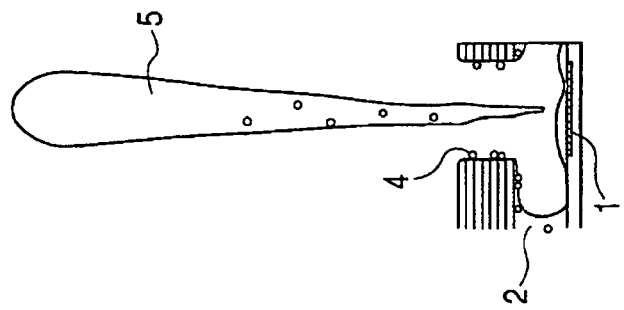
Figure 1F:
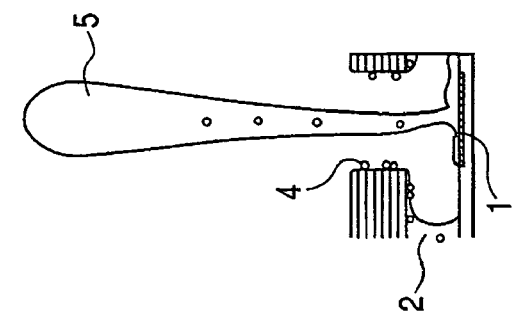
Figure 1G:
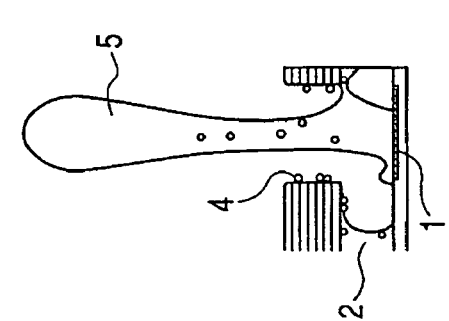
Figure 1H:
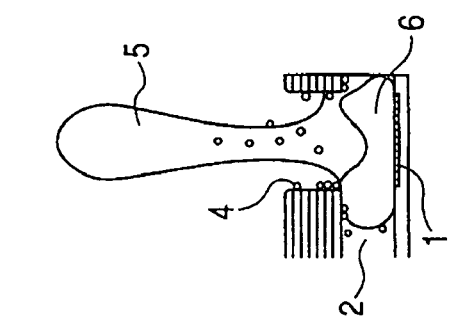

Thereafter, as shown in FIGS. 1B and 1C, the air bubble 6 rapidly increases its volume in 2.5 μsec. Then, as a result, the ink whose temperature has been raised is cooled. As the ink temperature falls, the pigment particles that became unstably dispersed in the ink can no longer maintain the dispersed state to cause pigment aggregation and then some pigment particles become deposited in the ink. While some deposited aggregates 4 of the pigment are ejected from an ejection orifice 3 in a state of being contained in an ink droplet 5, others remain in the inside of the ink flow path 2 and adhere to the flow path wall. As the operation of ejecting an ink as illustrated in FIGS. 1A to 1H is repeated, the aggregates 4 in the ink are increasingly deposited on the flow path wall.

(Relationship Between Peaks of DSC Curve of a Pigment and Deposits)

The inventors of the present invention looked into the relationship between the deposits generated and the properties of monoazo pigments that are used as coloring materials of ink. The inventors use monoazo pigments substantially showing neither an exothermic peak nor an endothermic peak in the range 25° C. or more to 200° C. or less of a DSC curve obtained by means of a differential scanning calorimeter (DSC). As a result, it was found that the generation of deposits in the ink flow path and vicinity of the ejection orifices is suppressed to obtain an excellent ejection stability, whereby accomplishing the present invention.

While the reason why the generation of deposits in the ink flow path and vicinity of the ejection orifices is suppressed by using a monoazo pigment having such properties is not clear, the inventors of the present invention assumes it as follows.

A pigment that substantially shows neither an exothermic peak nor an endothermic peak in a specific temperature range is a pigment in which both the pigment itself and the crystal structure of the pigment do not change in the temperature range. In other words, no fragmentation of a pigment that is attributable to a change in the pigment itself and the crystal structure of the pigment takes place in the temperature range where the pigment substantially shows neither an exothermic peak nor an endothermic peak. Then, as a result, when ink is ejected by means of a thermal type ink jet recording apparatus, the pigment in the ink is not decomposed if the temperature change of the ink that occurs when the ink is heated by a heater is within a temperature range where the pigment substantially shows neither an exothermic peak nor an endothermic peak on the DSC curve of the pigment. Then, the generation of deposits is suppressed in the ink flow path and vicinity of the ejection orifices to provide excellent ejection stability. When ink is ejected by means of a thermal type ink jet recording apparatus, the ink temperature is raised to about 200° C. at highest by thermal energy applied to the ink. From this assumption, the inventors of the present invention reached to the conclusion that the following is required to eject an ink containing a thermally poorly stable monoazo pigment by means of a thermal type ink jet recording apparatus. Namely, it is necessary to use a monoazo pigment that substantially shows neither an exothermic peak nor an endothermic peak in the entire temperature range that corresponds to the process in which ink is heated from the room temperature (25° C.) to get to 200° C. In other words, according to the present invention, it is possible to suppress the generation of deposits in the ink flow path and vicinity of the ejection orifices and achieve an excellent ejection stability by using a monoazo pigment substantially showing neither an exothermic peak nor an endothermic peak in the range 25° C. or more to 200° C. or less.

Figure 3:
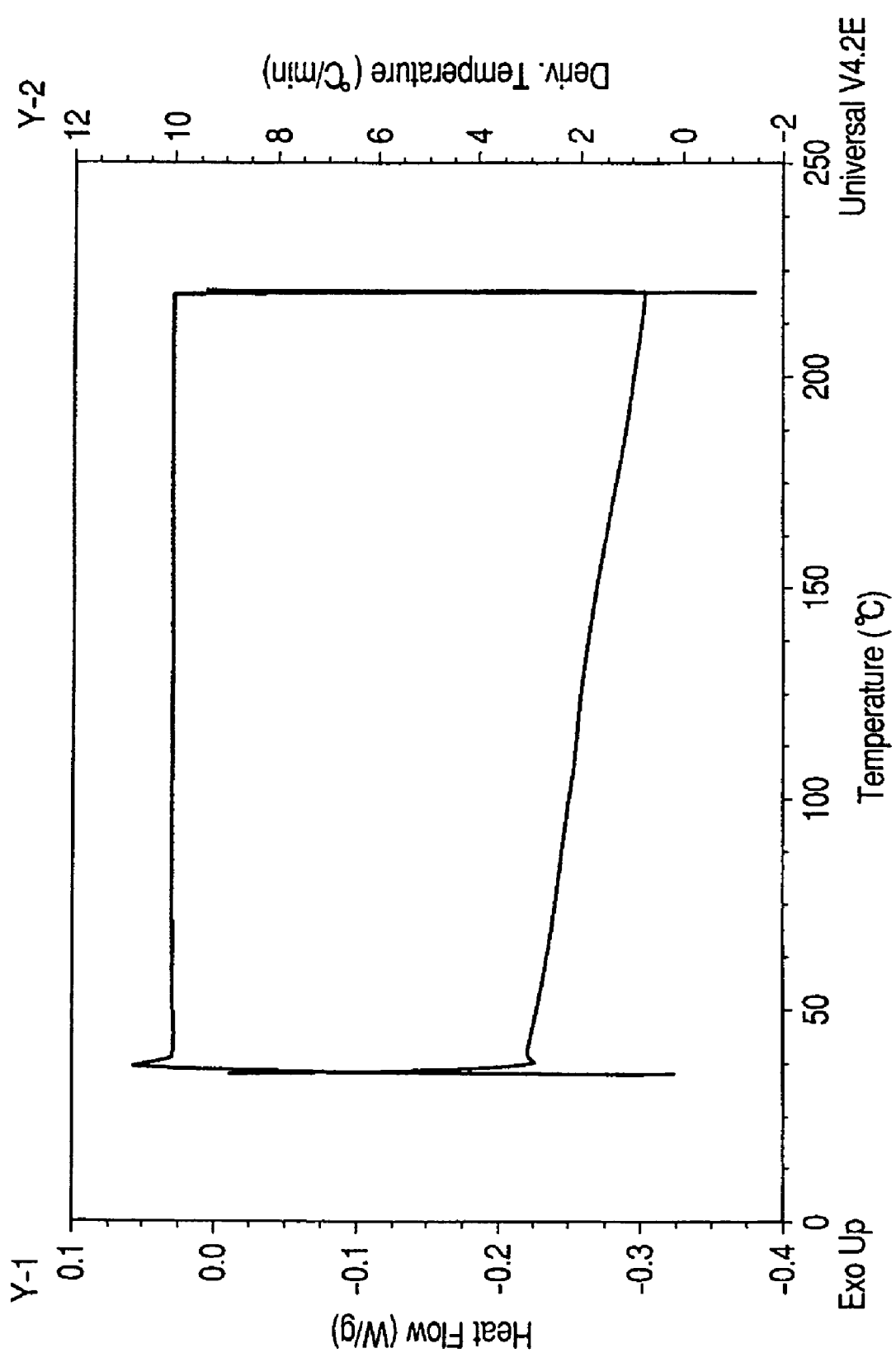
FIG. 3 is a DSC curve of C. I. Pigment Yellow 74 that is a pigment according to the present invention.
Figure 4:
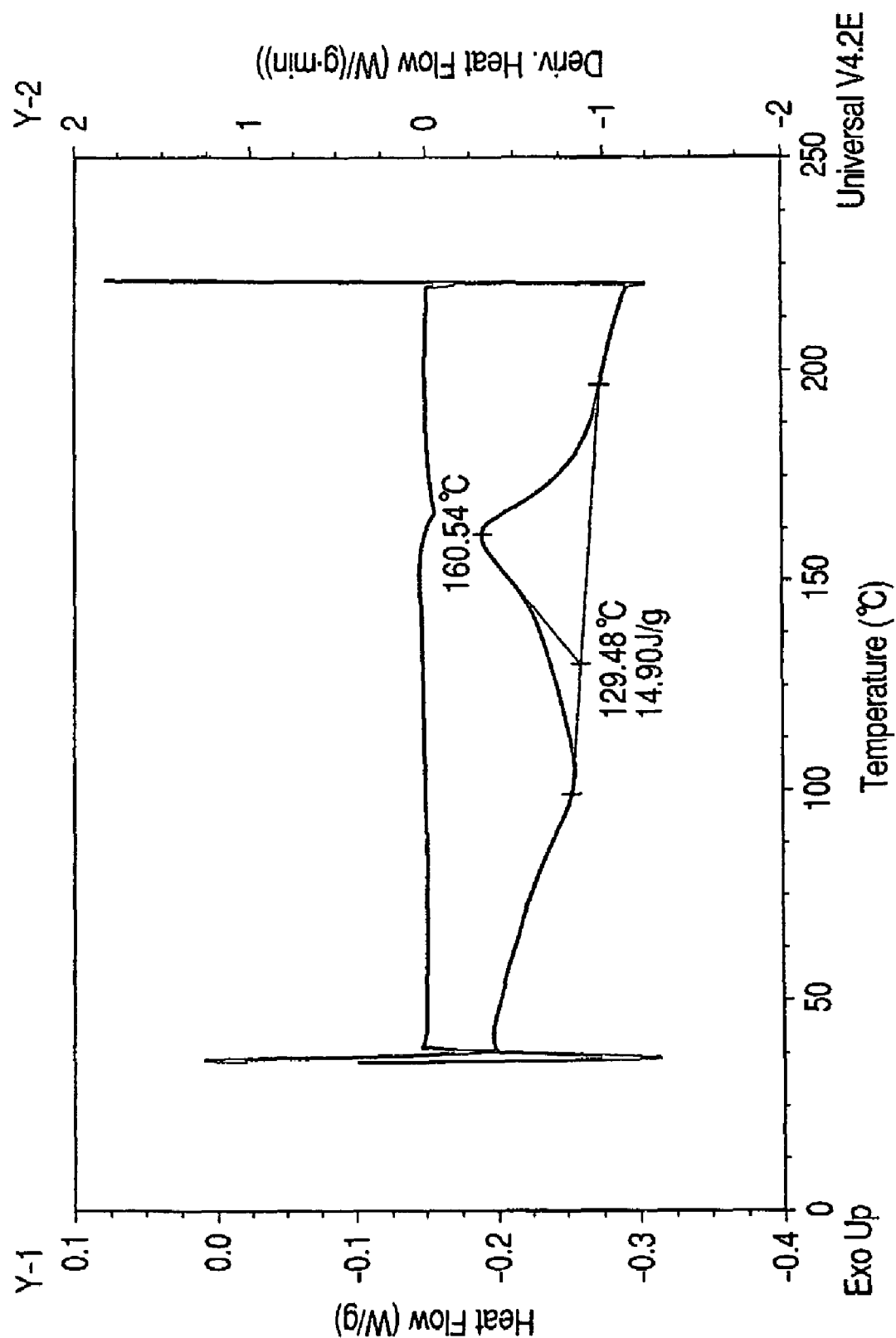
FIG. 4 is a DSC curve of Hansa Brilliant Yellow 5GX-W.

FIG. 3 is a DSC curve of a monoazo pigment (pigment dispersion 1 as will be described later) that substantially shows neither an exothermic peak nor an endothermic peak in the range 25° C. or more to 200° C. or less. On the other hand, FIG. 4 is a DSC curve of a monoazo pigment (pigment dispersion 2 as will be described later) that shows an exothermic peak in the range 25° C. or more to 200° C. or less.

It should be noted for the purpose of the present invention that the expression of "substantially showing neither an exothermic peak nor an endothermic peak" refers to the condition where neither an exothermic peak nor an endothermic peak that is 4 J/g or more is present, taking the mechanical error of a general differential scanning calorimeter (DSC). As a result of a study made by the inventors of the present invention, it was found that no fragmentation of pigments occurs and no deposits are generated in the ink flow path and vicinity of the ejection orifices when the exothermic peak and the endothermic peak are lower than 4 J/g.

<Ink>

Now, the components of an ink according to the present invention will be described in detail below.

(Monoazo Pigment)

Now, the monoazo pigment and the dispersant which compose an ink according to the present invention will be described below.

An ink according to the present invention is required to indispensably contain a pigment represented by the general formula (1). As may be clear from the structure, a pigment represented by the general formula (1) is a monoazo pigment.

General formula (1)

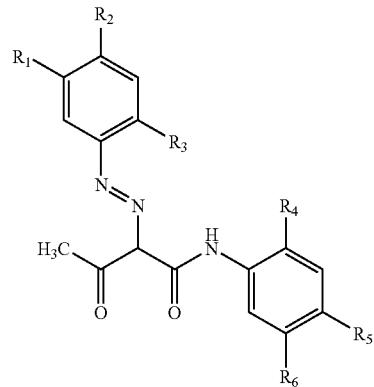

(In the general formula (1), $R_1$, $R_2$, $R_3$, $R_4$, $R_5$ and $R_6$ each independently represent a hydrogen atom, an alkyl group having 1 to 3 carbon atoms, a fluoroalkyl group having 1 to 3 carbon atoms, an alkoxyl group having 1 to 3 carbon atoms, a halogen atom, a nitro group, a sulfonic acid group or an alkaline earth metal salt thereof, an N-phenylaminosulfonyl group, a carboxyl group or an alkaline earth metal salt thereof, a carboamide group, an N-phenylcarbamoyl group, an ureylene group, an iminodicarbonyl group or a carboxylate group.)

Specific examples of pigments that are represented by the general formula (1) non-limitedly include the following.
C. I. Pigment Yellows: 1, 2, 3, 5, 6, 49, 65, 73, 74, 75, 97, 98, 111, 116, 130, 61, 62: 1, 133, 168, 169 and so on.
C. I. Pigment Oranges: 1 and so on.

For the purpose of the present invention, it is indispensably necessary for the pigment represented by the general formula (1) is a pigment that substantially shows neither an exothermic peak nor an endothermic peak in the range 25° C. or more to 200° C. or less of a DSC curve obtained by means of a differential scanning calorimeter (DSC). More specifically, a pigment having such properties as described above can be obtained by adjusting the primary particle diameter within a range 100 nm or more to 200 nm or less. A pigment having a primary particle diameter found within the above described range can be synthetically prepared by, for example, appropriately controlling the reaction temperature, the pigment concentration and the reaction time in the coupling reaction for synthesizing the pigment. It is also possible to regulate the primary particle diameter of the pigment by performing an aging step after synthesizing the pigment. For the purpose of the present invention, it is important to obtain such a primary particle diameter for the pigment as to substantially show neither an exothermic peak nor an endothermic peak in the range 25° C. or more to 200° C. or less of a DSC curve, and the means therefore are not limited to the above-described ones.

For the purpose of the present invention, the primary particle diameter refers to the length of the longest axis of each pigment particle as observed through a scanning electron microscope (SEM). For the purpose of the present invention, it is possible to provide a pigment that substantially shows neither an exothermic peak nor an endothermic peak on the DSC curve by adjusting the primary particle diameter within the above cited range, which primary particle diameter is the diameter of the particle itself and is not the weight average particle diameter that is observed in a state where the pigment is dispersed in an aqueous medium.

The content (mass %) of the pigment is preferably from 0.1 mass % or more to 15.0 mass % or less, more preferably from 1.0 mass % or more to 10.0 mass % or less, with respect to the total mass of the ink. It is possible to satisfactorily maintain the dispersed condition of the pigment dispersion in the ink when the content of the pigment is within the above-cited range.

(Dispersant)

An ink according to the present invention should indispensably contain a dispersant in order to disperse the monoazo pigment into the aqueous medium. It is preferable to use resin that can stably disperse the monoazo pigment in the aqueous medium by the effect of the anionic groups it has. For the purpose of the present invention, the dispersant may be omitted when a self-dispersing type pigment is used. If such is the case, however, it is preferable to use a dispersant in order to stably disperse the pigment.

Examples of dispersants that can be used for the purpose of the present invention include styrene-acrylic acid copolymers, styrene-acrylic acid-acrylic alkyl ester copolymers, styrene-maleic acid copolymers, styrene-maleic acid-acrylic alkyl ester copolymers, styrene-methacrylic acid copolymers, styrene-methacrylic acid-acrylic alkyl ester copolymers, styrene-maleic half ester copolymers, vinylnaphthalene-acrylic acid copolymers, vinylnaphthalene-maleic acid copolymers, styrene-maleic anhydride-maleic half ester copolymers and salts thereof.

For the purpose of the present invention, the weight average molecular weight of the dispersant is preferably between 1,000 and 30,000, more preferably between 3,000 and 15,000.

The type of dispersion of the pigment is not limited to the above-described one. Alternatively, the pigment may be microencapsulated by means of polymers or reduced to colored micro-particles by coating resin particles with a coloring material. The microencapsulated pigment has dispersibility in an aqueous medium. A dispersant as described above may further be added to the ink in order to enhance the dispersion stability. When colored micro-particles are used as coloring material, it is preferable to use an anionic dispersant as described above.

The content (mass %) of the dispersant with respect to the total mass of the ink is preferably 0.3 times or more to 2.0 times or less of the content of the pigment with respect to the total mass of the ink. If the dispersant is detached from the pigment, it is adsorbed to the pigment again when the content of the dispersant is 0.3 times or more of the content of the pigment with respect to the total mass of the ink. If the content of the dispersant exceeds 2.0 times of the content of the pigment, the dispersant that does not adsorb to the pigment exists in an excessively unnecessary amount. As a result, the ejection stability of the ink may be degraded as moisture is evaporated from the front end of the nozzle to raise the viscosity of the ink, and the dispersant adheres to the orifices of the recording head.

(Aqueous Medium)

An ink according to the invention may additionally contain water or an aqueous medium that is a mixed solvent of water and any of various water-soluble organic compounds. Note that the later-described aggregation inhibiting substance includes a substance that is classified as water-soluble organic compounds.

Specific examples of water-soluble organic compounds that can be used for the purpose of the present invention include alkyl alcohols having 1 to 4 carbon atoms such as methyl alcohol, ethyl alcohol, n-propyl alcohol, isopropyl alcohol, n-butyl alcohol, sec-butyl alcohol and tert-butyl alcohol; 1,2-alkanediols such as 1,2-pentanediol, 1,2-hexanediol, 1,2-heptanediol and 1,2-octanediol; amides such as dimethyl formamide and dimethyl acetamide; ketones and keto-alcohols such as acetone, diacetone alcohol; ethers such as tetrahydrofuran and dioxane; polyalkylene glycols such as polyethylene glycol and polypropylene glycol; alkylene glycols having 2 to 6 carbon atoms such as ethylene glycol, propylene glycol, butylene glycol, triethylene glycol, 1,2,6-hexanetriol, thiodiglycol, hexylene glycol and diethylene glycol; lower alkyl ether acetates such as polyethyleneglycol monomethylether acetate; glycerin; lower alkyl ethers of polyhydric alcohols such as ethyleneglycol monomethylether (and monoethylether), diethylene glycol methyl (or ethyl) ether, and triethyleneglycol monomethylether (and monoethylether); polyhydric alcohols such as trimethylol propane, trimethylol ethane; N-methyl-2-pyrrolidone, 2-pyrrolidone and 1,3-dimethyl-3-imidazolidinone.

For the purpose of the present invention, the content (mass %) of the water-soluble organic compound(s) is preferably 5.0 mass % or more to 16.5 mass % or less with respect to the total mass of the ink. It has been confirmed that the generation of deposits in the ink flow path and vicinity of the ejection orifices is suppressed when the content is held to a level within the above range, although it is not clear how the content of the water-soluble organic compound(s) influences the generation of deposits in the ink flow path and vicinity of the ejection orifices. However, the inventors of the present invention assumes that the compatibility of the water-soluble organic compound(s) and the hydrophobic part of a resin, which is a dispersant, rapidly increases to consequently relatively reduce the adsorptivity of the pigment and the resin, which is the dispersant, when the total content of the water-soluble organic compound(s) is more than 16.5 mass %.

The water content is preferably 68.5 mass % or more to 90.0 mass % or less with respect to the total mass of the ink, more preferably 73.0 mass % or more to 80.0 mass % or less.

(Effect of an Aggregation Inhibiting Substance That Inhibits Aggregation After the Dispersion Breakdown of the Pigment)

When an ink that contains a monoazo pigment is made to contain an aggregation inhibiting substance that inhibits aggregation after the dispersion breakdown that takes place when the ink temperature rises, the substance suppresses the generation of deposits to consequently improve the ejection stability. The reason therefore will be described below.

Figure 2C:
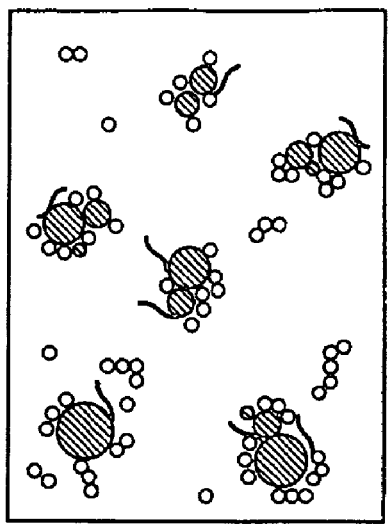
FIGS. 2A, 2B and 2C are schematic illustration of the effect of an aggregation inhibiting substance.
Figure 2B:
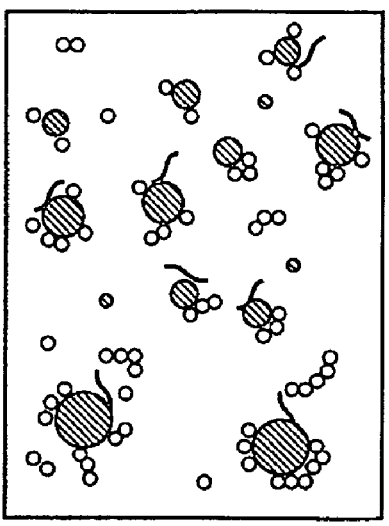
Figure 2A:
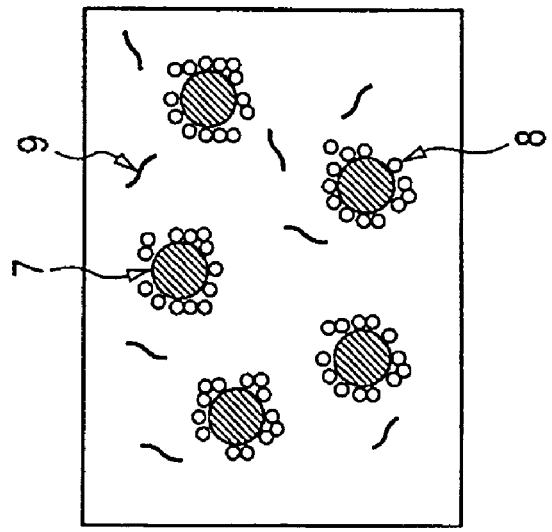

FIGS. 2A, 2B and 2C are schematic illustration of the effect of an aggregation inhibiting substance vicinity of the heater in a thermal type ink jet recording apparatus. Of FIGS. 2A to 2C, FIG. 2A shows a state before the heater is electrically energized according to a recording signal and FIG. 2B shows a state when the heater starts being electrically energized to give rise to air bubbles, while FIG. 2C shows a state where ink is ejected as the air bubbles grow.

Firstly, as shown in FIG. 2A, the temperature of the heater rises as the heater is electrically energized to by turn raise the temperature of the ink in the ink flow path. Then, as described above, dispersion breakdown of the pigment dispersion takes place in the ink whose temperature has been raised to give rise to phenomena such as detachment of a dispersant 8, which contributes to dispersion of a pigment 7, from the pigment 7 and fragmentation of the pigment 7. When the ink contains an aggregation inhibiting substance, the aggregation inhibiting substance 9 comes to be attached to the pigment 7 at areas where the dispersant 8 is detached and at exposed surfaces of the fragmented pigment 7. Thereafter, as the volume of the air bubbles expands, the ink whose temperature has been raised is cooled. As the ink temperature falls, the part of the pigment 7 that is unstably dispersed in the ink can no longer maintain the dispersed state and the pigment starts to aggregate. However, since the ink contains an aggregation inhibiting substance, the aggregation inhibiting substance 9 is attached to the pigment 7 to maintain the dispersed state to a certain extent as shown in FIG. 2C. As a result, it is possible to reduce the aggregates deposited in the ink.

(Aggregation Inhibiting Substance)

An ink according to the present invention preferably contains at least one aggregation inhibiting substance which is a water-soluble organic compound and suppresses aggregation of a pigment represented by the general formula (1) after dispersion breakdown thereof. This is because such substances can effectively suppress the phenomenon that deposits are generated in the ink flow path and vicinity of the ejection orifices to clog the ink flow path of the recording head.

Any appropriate aggregation inhibiting substance can be used so long as it is a compound that can be attached to the pigment in areas where the dispersant is detached and areas of exposed surfaces of the pigment. Specific examples of aggregation inhibiting substance that can be used for the purpose of the present invention include nonionic surfactants, anionic surfactants, 1,2-alkanediols and glycol monoalkyl ethers.

Specific examples of nonionic surfactants that can be used for the purpose of the present invention include polyoxyethylene glycerin fatty ester, sorbitan fatty ester, polyoxyethylene sorbitan fatty ester, polyoxyethylene sorbitol fatty ester, polyoxyethylene fatty ester, polyoxyethylene alkyl ether, polyoxyethylene polyoxypropylene alkyl ether, polyoxyethylene alkylaryl ether and acetyleneglycol type surfactants.

Specific examples of anionic surfactants that can be used for the purpose of the present invention include alkyl sulfates, alkylaryl sulfates, polyoxyethylene alkylether sulfates, alkylsulfoacetates, salts of fatty acids, alkylaryl carbonates and polyoxyethylene alkylether carboxylates.

Specific examples of 1,2-alkanediols that can be used for the purpose of the present invention include 1,2-pentadiol, 1,2-hexanediol, 1,2-heptanediol and 1,2-octanediol.

Specific examples of glycol monoalkyl ethers that can be used for the purpose of the present invention include ethyleneglycol monobutyl ether, diethyleneglycol monobutyl ether and triethyleneglycol monobutyl ether.

For the purpose of the present invention, it is preferable that the content (mass %) of the aggregation inhibiting substance with respect to the total mass of ink is 0.4 times or more and less than 1.3 times of the content (mass %) of the pigment with respect to the total mass of ink. The effect of containing the aggregation inhibiting substance in ink may not be obtained when the content of the aggregation inhibiting substance is less than 0.4 times of the content of the pigment. On the other hand, the dispersant can be detached from the pigment when the content of the aggregation inhibiting substance is not less than 1.3 times of the content of the pigment. Then, it may not be possible to suppress the generation of deposits in the ink flow path and vicinity of the ejection orifices.

For the purpose of the present invention, additionally, it is particularly preferable that the content (mass %) of the aggregation inhibiting substance with respect to the total mass of ink is 0.4 mass % or more to 3.0 mass % or less with respect to the total mass of the ink. For the purpose of the present invention, it is not necessary for the content to be more than 3.0 mass % because no further effect is expected when the content is more than 3.0 mass %. When, on the other hand, the content is less than 0.4 mass %, it may not possible to suppress the generation of deposits in the ink flow path and vicinity of the ejection orifices.

(Poor Medium)

As pointed out above, there are no limitations to water-soluble organic compounds that can be used for an ink according to the present invention so long they are suitable for ink jet recording.

When an ink according to the invention contains an aggregation inhibiting substance as water-soluble organic compounds, the ink preferably contains at least one poor medium for the dispersant. This is because such poor medium can effectively suppress the phenomenon that deposits are generated in the ink flow path and vicinity of the ejection orifices so as to clog the ink flow path of the recording head.

Now, the mechanism of achieving ejection stability for a prolonged period of time particularly when the ink contains a poor medium for the dispersant as selected from the above listed water-soluble organic compounds will be described below.

As illustrated in FIG. 2B, the aggregation inhibiting substance 9 is attached not only to parts of the pigment 7 where the dispersant 8 is detached and where surface of the pigment are exposed as a result of fragmentation but also to the dispersant 8. As a result, the dispersant 8 can be detached from the pigment 7 depending on the type of the aggregation inhibiting substance and the content thereof in the ink.

When the ink contains a poor medium for the dispersant 8, the force attaching the dispersant 8 to the surface of the pigment 7 is dominant relative to the affinity of the dispersant 8 relative to the aqueous medium of the ink. Thus, it may be assumed that the aggregation inhibiting substance 9 can hardly come off from the pigment 7 if it is attached to the dispersant 8 so that the dispersion stability of the pigment is held much higher.

For the purpose of the present invention, there are no limitations to water-soluble organic compounds as a poor medium for the dispersant so long as it provides the above described effect. However, the advantages of the present invention are most remarkable when 1,5-pentadiol is used as a poor medium. Needless to say, the present invention is by no means limited thereto. Note, for the purpose of the present invention, surfactants are excluded from water-soluble organic compounds when judging if such a compound is a poor medium or not for the dispersant.

(Method of Selecting a Poor Medium)

Now, the method of selecting a water-soluble organic compound as a poor medium for the dispersant will be described below. The inventors of the present invention discussed about the criteria to be used for judging a poor medium as suitable or unsuitable from the viewpoint of the advantages of the present invention and found that the following judging method is effective.

Firstly, an aqueous solution containing 50 mass % of a water-soluble organic compound being a subject to be judged, 45 mass % of water and 5 mass % of a dispersant to be used in ink is prepared. Then, after storing the prepared aqueous solution at 60° C. for 24 hours, the turbidity of the prepared solution is visually compared with that of an aqueous solution containing 50 mass % of the water-soluble organic compound and 50 mass % of water.

More specifically, the method as described below was used to judge if the water-soluble organic compound to be used is a poor medium for a given dispersant or not. Firstly, two aqueous solutions including aqueous solution A of a given dispersant containing a water-soluble organic compound to be judged and aqueous solution B of the dispersant were prepared.

Aqueous solution A: an aqueous solution containing 50 mass % of the water-soluble organic compound to be judged, 5 mass % of the given dispersant and 45 mass % of water Aqueous solution B: an aqueous solution containing 50 mass % of the water-soluble organic compound to be judged and 50 mass % of water.

Then, after storing the aqueous solution A at 60° C. for 24 hours, it was cooled to the room temperature and then visually observed for the turbidity thereof. Similarly, the aqueous solution B was visually observed for the turbidity thereof. If the aqueous solution A is more turbid, the water-soluble organic compound was judged to be a poor medium.

Specific examples of water-soluble organic compounds that can be used as poor mediums for the purpose of the present invention include polyethylene glycol (molecular weight 1000) and 1,2-hexanediol. However, for the purpose of the present invention, if a water-soluble organic compound is a poor medium or not is judged from the viewpoint of the relationship with the dispersant used in an ink. Therefore, the present invention is by no means limited to the above-listed specific examples of poor mediums.

The content of the water-soluble organic compound that operates as a poor medium for the dispersant is not subjected to any particular limitations so long as the water-soluble organic compound is effective for improving the effect of suppressing the generation of deposits in the ink flow path and vicinity of the ejection orifices and/or the storage stability of the ink. However, the content (mass %) of the poor medium with respect to the total mass of the ink is preferably 0.8 times or more to 4.0 times or less of the content (mass %) of the pigment with respect to the total mass of the ink. If the ratio of the content of the poor medium to that of the pigment is less than 0.8 times, the affinity of the hydrophilic part of the resin, or the dispersant, for the aqueous medium of the ink rises. Then, as a result, it may not be able to satisfactorily suppress the phenomenon that the dispersant is detached from the pigment as a result of attachment of the aggregation inhibiting substance to the dispersant. If, on the other hand, the ratio of the content of the poor medium to that of the pigment is more than 4.0 times, it may not be able to attain a satisfactory level of storage stability for the ink.

For the purpose of the present invention, it is particularly preferable that the content (mass %) of the poor medium is 3.0 mass % or more to 10.0 mass % or less with respect to the total mass of the ink. The above described effects may not be sufficiently obtained when the content is less than 3.0 mass % or more than 10.0 mass %.

(Other Ingredients)

If necessary, an ink according to the present invention may contain a moisture retaining agent to such an extent that may not obstruct the effects and advantages of the present invention. A surfactant, a defoaming agent, an antiseptic agent and/or an anti-mold agent may be added to an ink according to the present invention. It is preferable to adjust the physical properties of the ink including the viscosity and the pH value to desired respective levels when the ink is applied to an ink jet recording apparatus in order to realize a good ejection performance.

<Ink Set>

An ink according to the present invention can advantageously be used in an ink set where the ink is combined with other inks. An ink set according to the present invention is to be used as a combination of an ink according to the present invention and at least one ink having a hue different from that of the ink. The hue of the ink different in hue is not subjected to any particular limitations. For example, in the case of a yellow ink containing C. I. Pigment Yellow 74 as a monoazo pigment, the ink different in hue may be at least one selected from the group of inks of the colors of magenta, cyan, red, green, blue and black. There are no limitations to coloring materials that can be used for the ink having a different hue. In other words, known dyes and pigments may be used.

<Ink Cartridge>

An ink cartridge to be suitably used for recording by means of an ink according to the invention has an ink storage portion.

<Ink Jet Recording Apparatus>

An ink jet recording apparatus to be used for recording by means of an ink according to the invention is adapted to produce ink droplets by applying thermal energy or mechanical energy that corresponds to a recording signal to the ink contained in an ink storage portion of a recording head having the ink storage portion. The present invention is particularly advantageous when the ink jet recording apparatus is a thermal type ink jet recording apparatus adapted to eject ink from the recording head thereof through action of thermal energy.

EXAMPLES

Now, the present invention will be described further by way of examples and comparative examples. Note, however, that the present invention is by no means limited by the examples that are described below without departing from the scope of the present invention. In the following description, "parts" and "%" refer respectively to parts by mass and % by mass unless noted otherwise.

Differential scanning calorimetry (DSC) is a technique of differential calorimetric analysis. For the purpose of the present invention, a DSC Q1000 (trade name, available from TA Instruments Co.) was used for DSC observations. The observations were conducted with a heating rate of 10 K/min within a temperature range of 25° and 220° C.

The weight average particle diameters were observed by means of a laser zeta potentiometer ELS8000 (trade name, available from OTSUKA ELECTRONICS).

(Synthesis of C. I. Pigment Yellow 74)

187.8 parts of 2-methoxy-4-nitro-aniline was added to a mixed aqueous solution containing 1,300 parts of water and 290 parts of 35% aqueous solution of hydrochloric acid and stirred. The obtained aqueous solution was cooled to 0° C. and subsequently diazotized by adding 80 parts of sodium nitrite.

241.8 parts of 2-methoxyacetanilide was added to 5,000 parts of water and dissolved with 48 parts of sodium hydroxide. Crystals were deposited in the aqueous solution as a result of adding a mixed solution of 196 parts of acetic acid and 196 parts of water to obtain a suspension containing a coupling ingredient.

The diazo aqueous solution which has become transparent was added by being caused to flow down to the above described acidic suspension of acetic acid that operates as coupling ingredients at 15° C. within 1 and a half hour to 2 hours.

When the coupling reaction was over, the obtained pigment was filtered and subsequently washed with water, dried and then crushed to powder to obtain 463 parts of a yellow azo pigment.

The obtained pigment was observed through a differential scanning calorimeter (DSC) to find that it substantially showed neither an exothermic peak nor an endothermic peak in the range 25° C. or more to 200° C. or less of the DSC curve. When the obtained pigment was observed through a scanning electron microscope (SEM) to gauge the primary particles diameter, it was found that all the particles were 100 nm or more to 190 nm or less.

[Preparation of Pigment Dispersion]

(Pigment Dispersion 1)

The materials listed below were loaded in a batch type vertical sand mill (available from AIMEX) with 150 parts of zirconia beads having a diameter of 0.3 mm and dispersed for 5 hours, while being cooled with water. The obtained dispersion solution was treated for centrifugation to remove coarse particles. As a final product prepared, a pigment dispersion 1 containing 12% of pigment solid matter with a weight average particle diameter of 125 nm was obtained.

pigment [C. I. Pigment Yellow 74 obtained as above]: 10 parts anionic polymer P-1 [styrene/acrylic acid copolymer, acid value 200, weight average molecular weight 10,000, aqueous solution of 10% solid resin content, neutralized with potassium hydroxide]: 30 parts pure water: 60 parts (Pigment Dispersion 2)

The materials listed below were loaded in a batch type vertical sand mill (available from AIMEX) with 150 parts of zirconia beads having a diameter of 0.3 mm and dispersed for 5 hours, while being cooled with water. The obtained dispersion solution was treated for centrifugation to remove coarse particles. As a final product prepared, a pigment dispersion 2 containing 12% of pigment solid matter with a weight average particle diameter of 120 nm was obtained.

pigment [C. I. Pigment Yellow 74 (trade name: Hansa Brilliant Yellow 5GX-W, available from Clariant Co.), exothermic peak of DSC curve: 161° C., exothermic heat: 14.9 J/g, primary particle diameter: 30 nm to 90 nm]: 10 parts anionic polymer P-1 [styrene/butyl acrylate/acrylic acid copolymer (copolymerization ratio (weight ratio)=30/40/30), acid value 202, weight average molecular weight 6,500, aqueous solution of 10% solid resin content, neutralized with potassium hydroxide]: 30 parts pure water: 60 parts

[Judgment on Poor Medium of Water-soluble Organic Compounds for Dispersant]

The following experiment was conducted in order to select the water-soluble organic compounds acting as a poor medium for the dispersant (anionic polymer P-1) in the above described pigment dispersion. First, two aqueous solutions including aqueous solution A of a dispersant that contains a water-soluble organic compound to be judged and aqueous solution B of the water-soluble organic compound to be judged were prepared. Note that, surfactants were excluded from water-soluble organic compounds when judging whether it is a poor medium or not for the dispersant.

aqueous solution A: an aqueous solution containing 50 mass % of the water-soluble organic compound to be judged, 5 mass % of the dispersant and 45 mass % of water.

aqueous solution B: an aqueous solution containing 50 mass % of the water-soluble organic compound to be judged and 50 mass % of water.

Then, the aqueous solution A was stored at 60° C. for 24 hours and subsequently cooled to the room temperature and the turbidity of the aqueous solution was visually observed. The turbidity of the aqueous solution B was visually observed in a similar manner. Then, if the aqueous solution A is more turbid than the aqueous solution B, the water-soluble organic compound was judged to be a poor medium.

Table 1 shows the results obtained by the above judgments with respect to water-soluble organic compounds usable in ink to show if each of them is a poor medium for the dispersant (anionic polymer P-1) or not. In Table 1, 'O' indicates that the corresponding water-soluble organic compound is a poor medium and 'x' indicates that the corresponding water-soluble organic compound is not a poor medium.

TABLE 1

| water-soluble organic compounds | judgment |
|---|---|
| glycerin | x |
| ethylene glycol | x |
| polyethylene glycol (*1) | o |
| 1,2-hexanediol | o |

(*1): average molecular weight 1,000

[Preparation of Ink]

The ingredients listed in Table 2 were mixed and fully stirred. Subsequently, the mixture was filtered through a micro filter (available from Fuji Photo Film Co., Ltd.) with a pore size of 1.0 μm under pressure to prepare inks 1 to 17. Table 2 also shows the contents of the pigment, the dispersant, water, the aggregation inhibiting substance, the water-soluble organic compounds and the poor medium, the ratio of the aggregation inhibiting substance relative to the pigment, and the ratio of the poor medium relative to the pigment in each ink.

TABLE 2

| | ink | | | | | | |
|---|---|---|---|---|---|---|---|
| | 1 | 2 | 3 | 4 | 5 | 6 | 7 |
| pigment dispersion 1 | 33.3 | 33.3 | 33.3 | 33.3 | 33.3 | 33.3 | |
| pigment dispersion 2 | | | | | | | 33.3 |
| glycerin | 11.0 | 9.0 | 11.0 | 9.0 | 11.0 | 10.0 | 9.0 |
| ethylene glycol | 8.0 | 6.0 | 8.0 | 6.0 | 8.0 | 6.0 | 6.0 |
| polyethylene glycol (*1) | | 4.0 | | 4.0 | | | 4.0 |
| 1,2-hexanediol | | | 1.0 | 2.0 | | | |
| polyoxyethylene cetyl ether (*2) | | | | | 1.0 | | |
| water | 47.7 | 47.7 | 46.7 | 45.7 | 46.7 | 50.7 | 47.7 |
| content of pigment | 4.0 | 4.0 | 4.0 | 4.0 | 4.0 | 4.0 | 4.0 |
| content of dispersant | 1.5 | 1.5 | 1.5 | 1.5 | 1.5 | 1.5 | 1.5 |
| content of water | 75.5 | 75.5 | 74.5 | 73.5 | 74.5 | 78.5 | 75.5 |
| content of aggregation inhibiting substance | 0.0 | 0.0 | 1.0 | 2.0 | 1.0 | 0.0 | 0.0 |
| content of water-soluble organic compounds | 19.0 | 19.0 | 20.0 | 21.0 | 19.0 | 16.0 | 19.0 |
| content of poor medium | 0.0 | 4.0 | 1.0 | 6.0 | 0.0 | 0.0 | 4.0 |
| ratio of aggregation inhibiting substance relative to pigment | 0.0 | 0.0 | 0.25 | 0.5 | 0.25 | 0.0 | 0.0 |
| ratio of poor medium relative to pigment | 0.0 | 1.0 | 0.25 | 1.5 | 0.0 | 0.0 | 1.0 |

(*1) average molecular weight 1,000
(*2) BC-20TX (surfactant: available from NIKKO CHEMICALS)

[Evaluation]

(1) Ejection Stability

Each of the obtained inks as listed above was loaded in an ink jet recording apparatus BJF900 (trade name, available from Canon) and used for printing a solid pattern of 19 cm×26 cm on 300 A4-size sheets. A nozzle check pattern was printed after the 200-th sheet and also after the 300-th sheet and the obtained nozzle check patterns were visually observed. The criteria of evaluation of ejection stability are listed below. Table 3 shows the results of the evaluation.

A: The check pattern was not disturbed and normally printed.

B: The check pattern was slightly disturbed but no ejection failure was observed.

C: The check pattern was clearly disturbed and ejection failure was observed on the check pattern, so normal printing could not be conducted.

(2) Deposits

Each of the obtained inks as listed above was loaded in an ink jet recording apparatus BJF900 (trade name, available from Canon) and used for printing a solid pattern of 19 cm×26 cm on 300 A4-size sheets. The recording head was taken out from the ink jet recording apparatus after printing on the 200-th sheet and also after printing on the 300-th sheet and the inside of the nozzle was observed through an optical microscope. The criteria of evaluation of deposits are listed below. Table 3 shows the results of the evaluation.

A: Practically no deposits were found.
B: Deposits were found a little on the nozzle wall.
C: Deposits were found everywhere in the nozzle.

TABLE 3

| | | Examples | | | | | | Comp. Ex. |
|---|---|---|---|---|---|---|---|---|
| | | 1 | 2 | 3 | 4 | 5 | 6 | 1 |
| | ink | 1 | 2 | 3 | 4 | 5 | 6 | 7 |
| ejection stability | 200-th sheet | A | A | A | A | A | A | B |
| | 300-th sheet | B | A | A | A | A | A | B |
| deposits | 200-th sheet | A | A | A | A | A | A | C |
| | 300-th sheet | B | B | A | A | B | B | C |

The extent of appearance of deposits after printing on the 300-th sheet of Ink 3 is slightly more than the extent of appearance of deposits after printing on the 300-th sheet of Ink 4.

This application claims the priority from Japanese Patent Application No. 2005-010305 filed Jan. 18, 2005, which is hereby incorporated by reference herein.

What is claimed is:

1. An ink for use in an ink jet recording method in which an ink is ejected from a recording head through action of thermal energy,
   wherein the ink comprises a pigment represented by the general formula (1), a dispersant, and a water-soluble organic compound,
   wherein the water-soluble organic compound comprises polyethylene glycol having an average molecular weight of 1,000 and 1,2-alkanediol,
   wherein the pigment substantially shows neither an exothermic peak nor an endothermic peak in a range of 25° C. or more to 200° C. or less of a DSC curve obtained by means of a differential scanning calorimeter (DSC);

General formula (1)

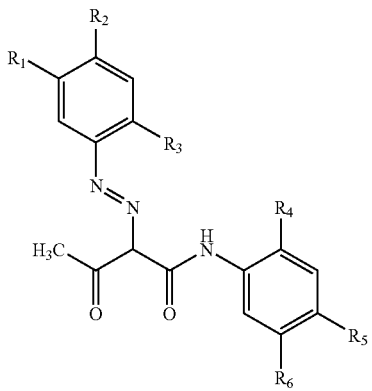

wherein $R_1$, $R_2$, $R_3$, $R_4$, $R_5$ and $R_6$ each independently represent a hydrogen atom, an alkyl group having 1 to 3 carbon atoms, a fluoroalkyl group having 1 to 3 carbon atoms, an alkoxyl group having 1 to 3 carbon atoms, a halogen atom, a nitro group, a sulfonic acid group or an alkaline earth metal salt thereof, an N-phenylaminosulfonyl group, a carboxyl group or an alkaline earth metal salt thereof, a carboamide group, an N-phenylcarbamoyl group, an ureylene group, an iminodicarbonyl group or a carboxylate group.

2. The ink according to claim 1, wherein the pigment represented by the general formula (1) is C. I. Pigment Yellow 74.

3. The ink according to claim 1, wherein the pigment represented by the general formula (1) has a primary particle diameter of 100 nm or more to 200 nm or less.

4. An ink set having a plurality of inks, comprising an ink according to claim 1 and at least one ink having a hue different from that of the ink.

5. An ink jet recording method, comprising a step of ejecting an ink by ink jet method, wherein the ink comprises the ink according to claim 1.

6. An ink cartridge, comprising an ink storage portion for storing ink, wherein the ink comprises the ink according to claim 1.

7. An ink jet recording apparatus, comprising an ink storage portion for storing ink and a recording head for ejecting an ink, wherein the ink comprises the ink according to claim 1.

8. The ink according to claim 1, wherein the ink further comprises an aggregation inhibiting substance.

9. The ink according to claim 8, wherein the aggregation inhibiting substance is selected from the group consisting of nonionic surfactant, anionic surfactant, and glycol monoalkyl ether.

10. The ink according to claim 1, wherein the 1,2-alkanediol is 1,2-hexanediol.

11. The ink according to claim 1, wherein a content of the water-soluble organic compound is 5.0 mass % or more to 16.5 mass % or less with respect to the total mass of the ink.

* * * * *

UNITED STATES PATENT AND TRADEMARK OFFICE
CERTIFICATE OF CORRECTION

PATENT NO. : 7,291,214 B2
APPLICATION NO. : 11/415174
DATED : November 6, 2007
INVENTOR(S) : Itaru Tsuji et al.

It is certified that error appears in the above-identified patent and that said Letters Patent is hereby corrected as shown below:

ON THE TITLE PAGE, AT ITEM (57), ABSTRACT:
Line 12, "(DSC)" should read --(DSC).--.

COLUMN 1:
Line 45, "lowers" should read --lower--.

COLUMN 4:
Line 10, "illustration" should read --illustrations--.
Line 11, "illustration" should read --illustrations--.
Line 56, "illustration" should read --illustrations--.

COLUMN 5:
Line 42, "assumes" should read --assume--.

COLUMN 9:
Line 8, "assumes" should read --assume--.
Line 27, "illustration" should read --illustrations--.

COLUMN 10:
Line 52, "possible" should read --be possible--.

COLUMN 11:
Line 56, "water" should read --water.--.

Signed and Sealed this

Sixteenth Day of December, 2008

JON W. DUDAS
*Director of the United States Patent and Trademark Office*